Patented Apr. 21, 1931

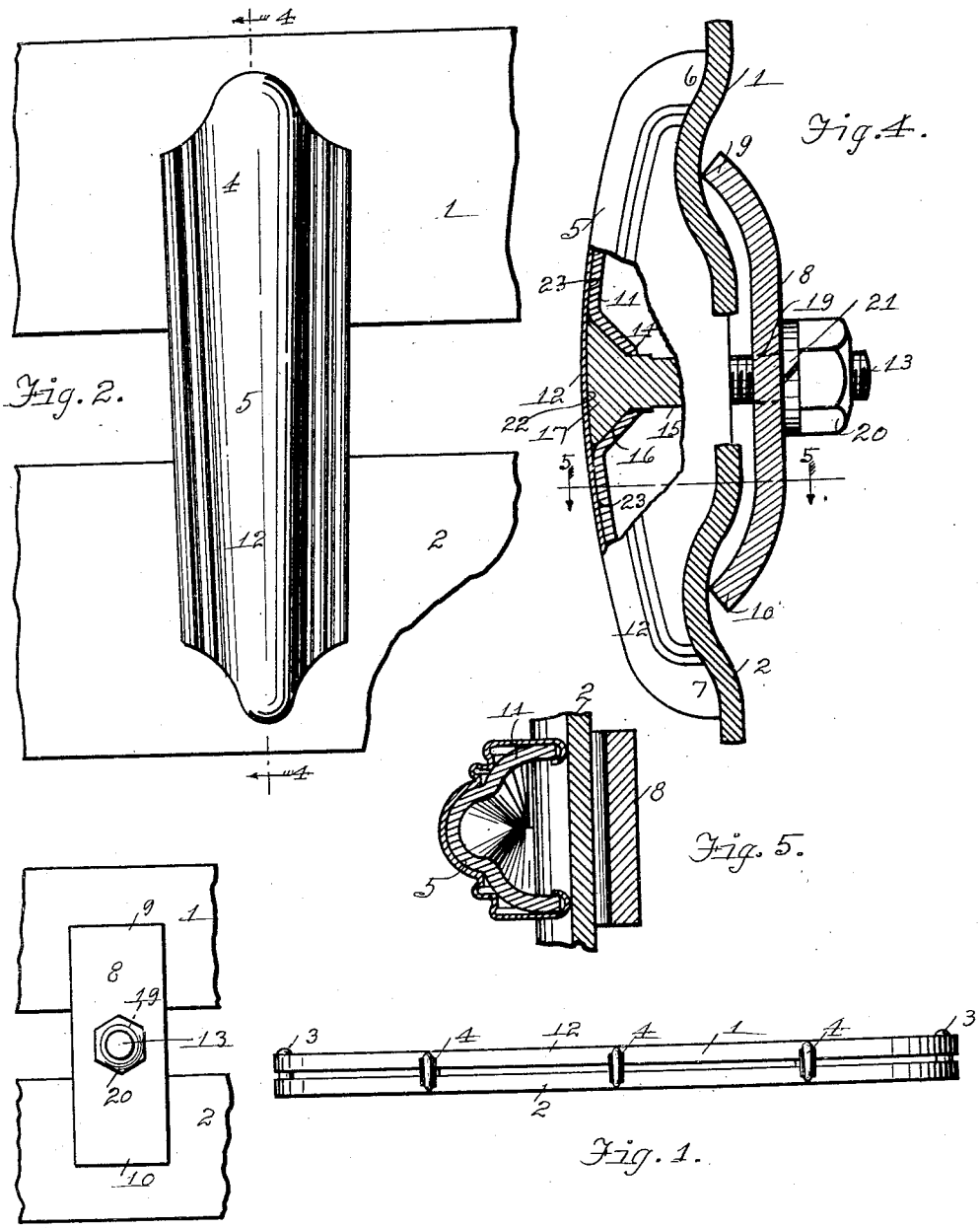

1,801,345

UNITED STATES PATENT OFFICE

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN

BUMPER FOR AUTOMOBILES

Application filed April 25, 1930. Serial No. 447,143.

The present invention relates to bumpers for automobiles and the like, and particularly to clamps for connecting the bars of such bumpers; and a principal object of the invention is to provide a clamp of that character having a clamp member provided with a face covering so mounted thereon as to be protected from distortion, indentations and like marring incident to impacts thereon; and further, to provide such a bumper having improved bars and clamps for connecting the same.

This and any other and more specific objects hereinafter appearing are attained by, and the invention finds preferable embodiment in, the structure hereinafter particularly described in the body of this specification and illustrated by the accompanying drawings, in which:

Figure 1 is a face view of an automobile bumper;

Figure 2 is an enlarged face view of a fragmentary portion thereof;

Figure 3 is a rear view of the same;

Figure 4 is a sectional view thereof taken on line 4—4 of Figure 2; and

Figure 5 is a sectional view of the same taken on line 5—5 of Figure 4.

In these drawings is illustrated a bumper for automobiles comprising parallelly and horizontally disposed bumper bars 1, 2, spaced apart vertically and having forwardly-convex and rearwardly-concave sides, and being, in the particular construction shown, hingedly connected at their ends by vertical pintles 3, the bumper being supported on the automobile in any well-known manner.

These bumper bars 1, 2 are connected (at three points in their length as shown in Figure 1) by clamps extending transversely thereof and indicated generally 4. Each of these clamps comprises a pair of clamp members, the front members 5 whose rearwardly-turned ends 6, 7 engage the front side of the bars adjacent their outer edges, i. e. the upper end 6 of said member engaging the upper bar 1 adjacent its upper edge and said member's lower end 7 engaging the lower bar 2 adjacent its lower edge, as seen in Figure 4; while the rear member 8 of the clamp engages at its forwardly-turned ends 9, 10 in the concave rear sides of the bars.

The front clamp member 5 is composed of two portions, a hollow rigid body 11 desirably made of stamped heavy sheet metal and a face or cover 12 made of comparatively thin sheet metal which may be plated or otherwise "finished" to provide a smooth, polished and ornamental face or outer surface. This cover 12 is secured to the body 11, in contacting relation with its front side and extending thereover, by any suitable means as by having its edges turned over the edges of the body as shown in Figure 5. A screw bolt 13 extends through these clamp members and between the bumper bars, for clamping these parts together. The body 11 of the front clamp member 5 has an aperture 14 receiving the shank 15 of the bolt, and in its front side has a socket 16 receiving the head 17 of the bolt which is held non-turnably in the front clamp member. The threaded rear end of the bolt extends through an aperture 19 in the rear clamp member and carries a nut 20 engaging said member to clamp the parts together, a washer 21 being shown under this nut.

The outer end 22 of the head 17 of the bolt is positioned flush with the outer side 23 of the body 11 of the front clamp member, i. e. said end 22 does not extend out of the socket 16 nor is it positioned inwardly from the mouth thereof, so that the cover 12 when applied to said body contacts the outer side of said body and the outer end of the bolt's head in the same continuous surface of body and bolt head. This cover is thus supported uniformly in all its parts by the body 11 and bolt head's end 22, contacting therewith; and being thus supported by these rigid parts beneath, the cover is not subject to indentations and like marring or distortion effects resulting from impacts with extraneous objects.

The invention being intended to be pointed out in the claims, is not to be limited to or by details of construction of the particular embodiment thereof illustrated by the drawings or hereinbefore described.

I claim:

1. In a bumper of the character described comprising forwardly-convex rearwardly-concave spaced bumper bars: a clamp for connecting said bars extending transversely thereof and comprising a rigid rear clamp member having forwardly-turned ends having knife edge engagement in the concave rear sides of said bars and a front curved clamp member having rearwardly-turned ends engaging the front sides of said bars between the respective convex surfaces and the adjacent outer edges thereof respectively, and a headed screw bolt extending through said clamp members and having its head formed on an arc corresponding with and lying in the same plane with the curvature of said front clamp member.

2. In a bumper of the character described comprising spaced bumper bars: a clamp member for connecting said bars comprising a rigid body having an aperture therethrough receiving the shank of a clamping bolt and in its front side a socket receiving non-turnably the head of the bolt, the front end of said head being flush with said front side, said clamp member comprising also a sheet metal covering extending over the entire surface of the front side of said body and over the front end of the bolt in contact therewith throughout the entire surface of the front end of the bolt to prevent indentations being formed in said sheet metal covering the latter being bent over the edges of said body in securing relation thereto.

3. In a bumper of the character described comprising spaced bumper bars: a clamp for connecting said bars extending transversely thereof and comprising front and rear clamp members engaging the front and rear sides of the respective bars and connected by a bolt extending therethrough having a head at its forward end and being threaded at its rear end, the front clamp member comprising a rigid body having an aperture therethrough receiving the shank of the bolt and in its front side a socket receiving the head of the bolt, the front end of said head being flush with said front side, the front clamp member comprising also a sheet covering secured to said body and extending over the front side thereof and contacting with the entire surface of the front end of the head of the bolt; and a nut on the bolt's threaded end in clamping relation with the rear clamp member whereby to firmly clamp said parts together and prevent accidental formation of indentations at any point along the face of the sheet covering.

In testimony whereof I have hereunto set my hand at Grand Rapids, Michigan, this 21st day of April, 1930.

MILTON B. HAMMOND.